US006179357B1

United States Patent
Gabriel

(10) Patent No.: US 6,179,357 B1
(45) Date of Patent: Jan. 30, 2001

(54) AUTOMATICALLY-ACTUATED CARGO AND PERSONNEL SCOOPING APPARATUS WITH PIVOTED EXTENSIONS, MAGNETS AND BUCKETS

(76) Inventor: Edwin Zenith Gabriel, 91 Mt. Tabor Way, Ocean Grove, NJ (US) 07756

( * ) Notice: Under 35 U.S.C. 154(b), the term of this patent shall be extended for 0 days.

(21) Appl. No.: 09/259,604

(22) Filed: Mar. 1, 1999

(51) Int. Cl.[7] ............................................. B66C 1/28
(52) U.S. Cl. .................. 294/118; 294/68.23; 294/119.3; 294/902
(58) Field of Search ................................ 294/66.1, 66.2, 294/68.23, 82.32, 106, 110.1, 118, 119.3, 902; 5/81.1 R, 83.1, 89.1; 244/137.1, 137.2, 137.4; 441/80, 83, 87

(56) References Cited

U.S. PATENT DOCUMENTS

| | | | |
|---|---|---|---|
| 3,807,783 | * 4/1974 | Van Huuksloot | 294/68.23 |
| 4,943,099 | * 7/1990 | Gabriel | 294/118 X |
| 5,209,538 | * 5/1993 | Gabriel | 294/118 |
| 5,713,538 | * 2/1998 | Gabriel | 294/118 X |
| 5,826,825 | * 10/1998 | Gabriel | 294/118 X |
| 5,868,357 | * 2/1999 | Gabriel | 294/118 X |

* cited by examiner

Primary Examiner—Johnny D. Cherry

(57) ABSTRACT

This apparatus is a tongs-like, load-lifting device for automatically loading and unloading objects and liquids, comprising two elongated numbers pivoted at a selected distance from the apparatus' top with a main pivot pin. Its lower portions are essentially vertical, and may have perforations, to hold in place either a retrieved object or liquids, when pivoted, hemispheric buckets are included. Two hammerheads, mounted at ends of horizontal bars, located on apparatus' upper portions, are provided with magnets to either attract or repel each other. One head may have an electromagnet and the other a permanent magnet, or both heads may have electromagnets. The bottoms of apparatus' lower portions have pivoted extensions to help support the load. The two extensions are held up by either springs or stretchable bands, so their ends would not injure a person. The extensions are pushed down by the person or the object entering the apparatus. When pivoted hemispheric buckets are used to scoop up liquids, the extensions are not pivoted. Apparatus' upper portions remain the same.

8 Claims, 6 Drawing Sheets

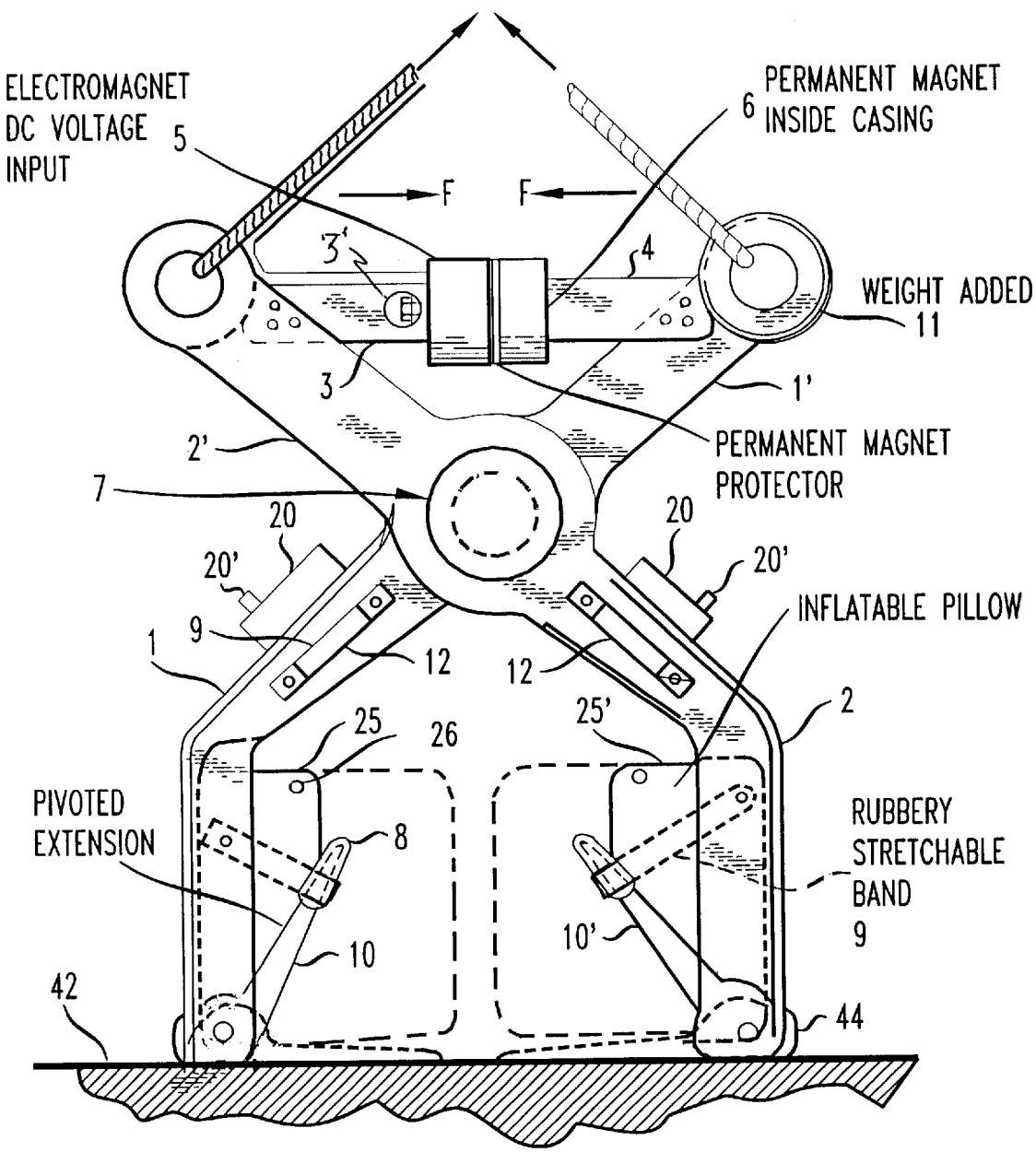

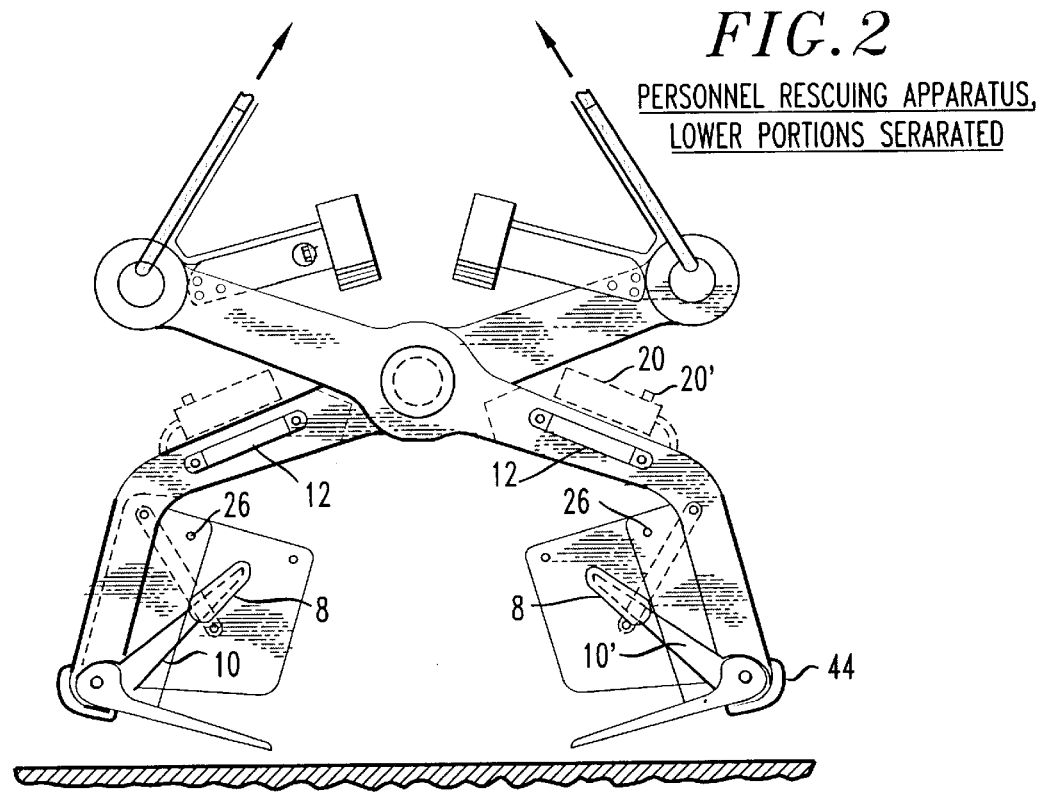
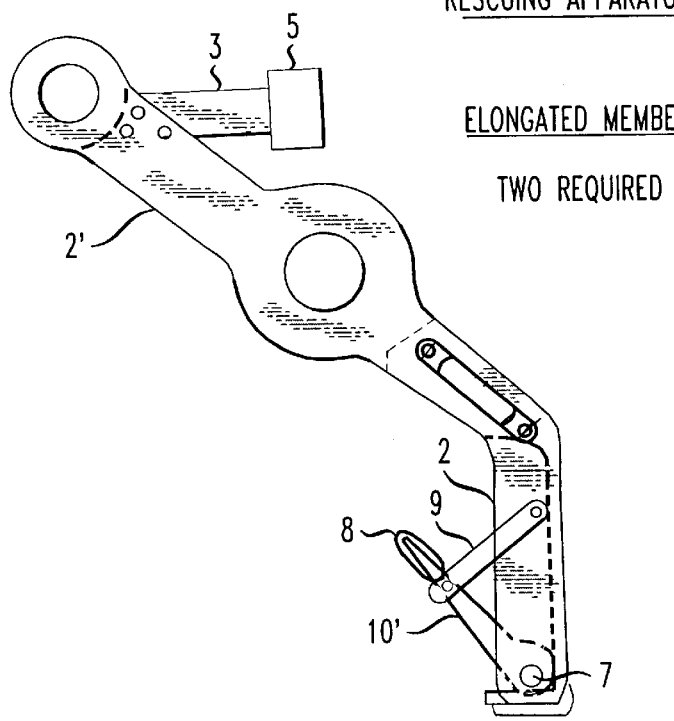
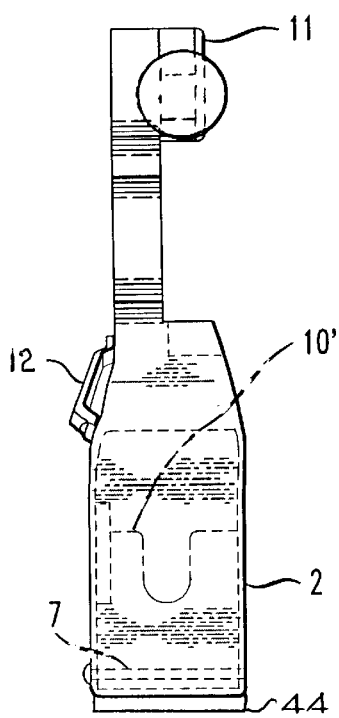

ELECTRIC CIRCUIT FOR RESCUING APPARATUS

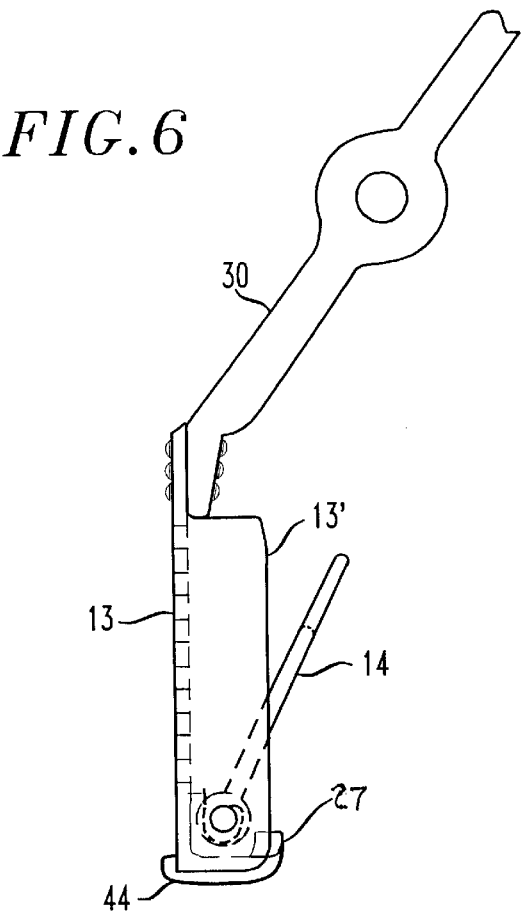
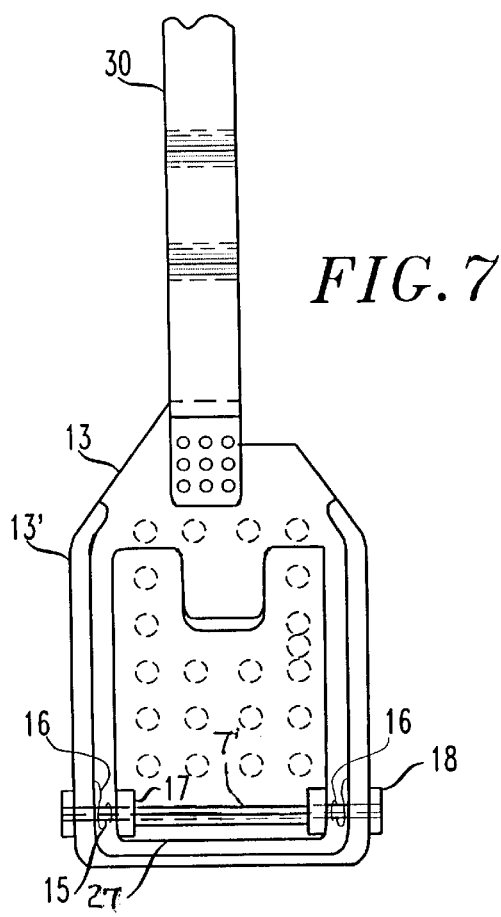
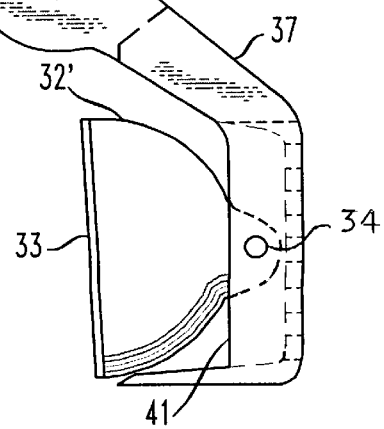
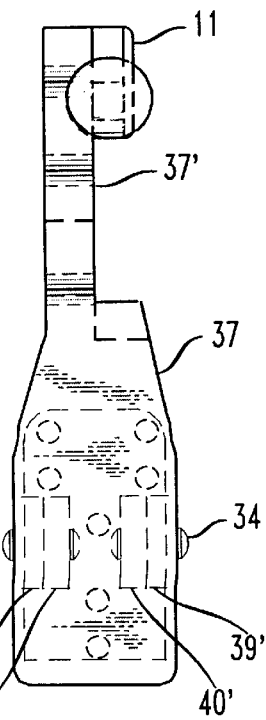

PERSONNEL RESCUING APPARATUS, LOWER PORTIONS SEPARATED

AUTOMATICALLY-ACTUATED CARGO AND PERSONNEL SCOOPING APPARATUS WITH PIVOTED EXTENSIONS, MAGNETS AND BUCKETS

CROSS-REFERENCE TO RELATED APPLICATIONS

This is not a continuation-in-part of a previous application, nor one that is co-pending.

RIGHTS TO INVENTIONS MADE UNDER FEDERALLY-SPONSORED RESEARCH AND DEVELOPMENT

None of the work on this invention was performed under any Federally-Sponsored or State-Sponsored research and development. Gabriel used his own resources on every phase of his project.

BACKGROUND OF THE INVENTION

1. Field of the Invention

This invention is in the field of load-snatching, material-handling and personnel rescuing apparatus, in which the entire load is scooped up without the need of load cables and hooks. The apparatus utilizes a helicopter as a means of supporting and assisting in the load-lifting and releasing operations. This disclosure with illustrations describes how the task can be performed more precisely and reliably, with less possibility of the apparatus causing injury to the load.

To assist in obtaining this goal of precise performance with less injury to the load, the extensions at the bottom of the lower portions would have pivots and stretchable bands to keep them away from the person to be rescued. The bottoms of the lower portions could have rubber resilient pads, so if accidentially a lower portion should come in contact with an object, less injury would result. Such pads do not exist in previous patents. Hammerheads at its upper portions have hammerheads with magnets capable of being magnetized to either repel or attract one hammerhead toward the other. When rescuing a person, its lower portions are provided with inflatable pillows. For scooping up liquids, hollow hemispheres are substituted for the pillows. No such cargo handling apparatus is known to the applicant having the improvements for harmlessly grabbing a load, such as a person.

2. Description of Prior Art

The inventor is only aware of patents issued under his name that relates to his present invention. U.S. Pat. No. 5,209,538 dated May 11, 1993 and U.S. Pat. No. 5,826,825 dated Oct. 27, 1998 on a similar apparatus has the appearance of the present one but lacks the type of magnets of the present one for its hammerheads for either attraction or repulsion. Then, they do not have pivoted extensions with either stretchable bands or coiled springs to hold them up. In addition, hollow hemispheres are able to scoop up liquids, instead of objects.

Another one by Gabriel, U.S. Pat. No. 4,678,220, dated Jul. 7, 1987, also describes a tongs-like lifting apparatus for loading and unloading containerized cargo, but this one has less relationship to the present one, in that the hammerheads and inflated pillows are missing. Gabriel's other patents, such as U.S. Pat. No. 4,943,099, dated Jul. 24, 1990, relate to cargo hooks with hoist cables that need to hook on to a cable attached to the load to be retrieved. They are incapable of snatching the entire load, such as containerized cargo. Other Gabriel patents are U.S. Pat. Nos. 5,826,825 and 5,868,357.

SUMMARY OF THE INVENTION

This is a multi-purpose cargo, personnel lifting apparatus with automatic loading and unloading capability, suspended from either a derrick or a helicopter.

Because of its ability to scoop up the entire load automatically and remotely without the aid of ground personnel, this apparatus could be of much assistance to the military for rescue missions of incapacitated personnel on the battlefield, or in rough seas, from roofs of burning buildings or from areas to which a poisonous gas may have been emitted.

As in previous U.S. Pat. No. 5,209,538, this apparatus comprises two elongated members, somewhat vertical and curved toward each other at its lower portions and pivoted at a selected distance from their top ends. This apparatus, too, has hammerheads extending toward each other from the inside of its upper portions, to receive all of the horizontal stress that may be imposed on the apparatus' lower portions. Because of the apparatus' distribution of weight, with the added weights on top and/or from assistance of an extension coil spring, the device's lower portions close automatically when tension is applied to the hoist cable upon lift-off.

BRIEF DESCRIPTION OF DRAWINGS

For the purpose of illustrating the precision capability of locating, positioning and scooping up a load with this automatically-actuated apparatus, the following drawings show forms which are presently preferred. It is to be understood that this invention is not necessarily limited to the precise arrangement, instrumentalities and field of utility as therein demonstrated.

FIG. 1 is a front view assembly of the apparatus, showing the upper portions, the pivot pin and the lower portions with inflatable pillows fastened to its walls. Pivoted, raised extensions are located at the bottom.

FIG. 2 shows the same assembly with the lower and upper portions spread apart and the pillows mostly deflated. Dashed lines in the form of a square at the main pivot pin show the location of a surveillance camera.

FIG. 3 shows one of the two longitudinal members comprising the apparatus to provide details such as the shape of the pivoted extension.

FIG. 3A is a side view thereof, providing the width of this member as well as the design of the pivoted extension in dashed lines.

FIG. 6 shows another design for the elongated member shown in FIG. 3, with an upper portion screwed onto a lower portion. Instead of a band, show in FIG. 3, coiled springs on an axle or shaft cause the pivoted extension to be lifted up.

FIG. 7 shows a side view thereof, providing information on the width of the members and parts described in FIG. 6.

FIG. 10 shows one of the two elongated members comprising the apparatus with the hemisphere resting on the extension at the bottom.

FIG. 10A is a side view thereof, providing information on the widths of the upper and lower portions and the technique for pivoting the hemisphere to the back surface of the lower portion.

DESCRIPTION OF A PREFERRED EMBODIMENT

Figure 4:
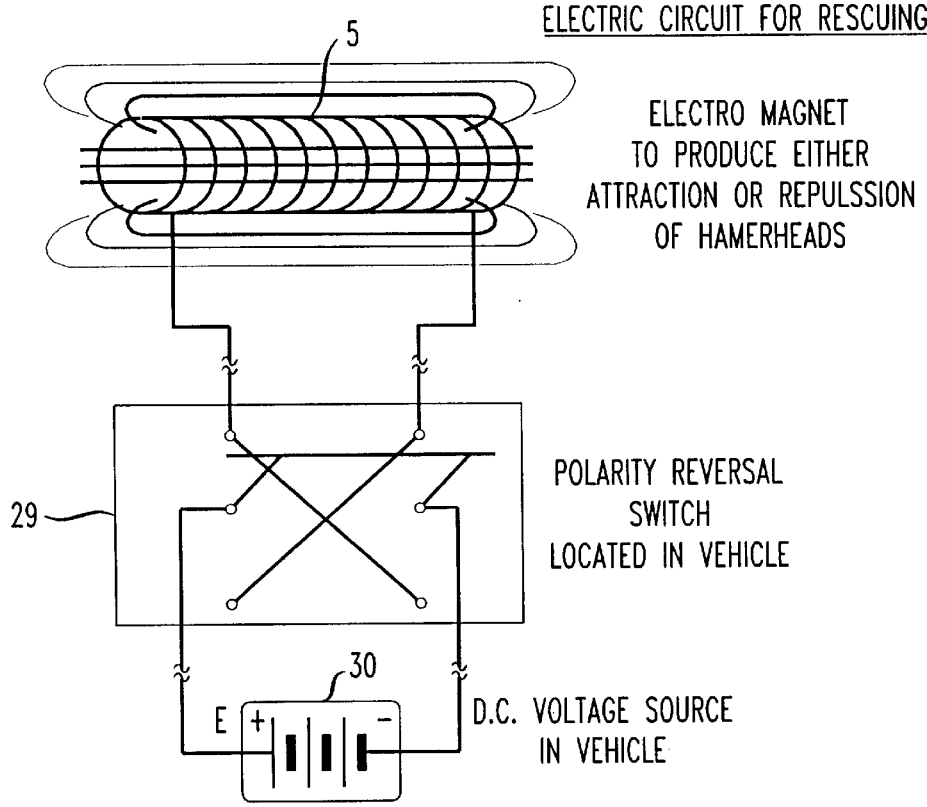
FIG. 4 is a circuit diagram for the electromagnet attached to the left bar near the top of the apparatus, showing the magnet, switch and voltage source.

FIG. 1 shows front view of the Apparatus' Assembly.

In this design, the upper portion's hammerheads aid in separating and closing the lower portions of the apparatus. In this technique, the left hammerhead 5 is an electromagnet (EM) and the right one is a permanent magnet 6. When the applied voltage to the EM is one polarity, a repulsion exists between the hammerheads, and the hammerheads separate as well as the lower portions, to allow an object to be scooped up. The lower portions 1 and 2 further separate when hoist cables on top slacken, and weights 11 on top move down by the force of gravity. To make it easier for an object to enter the enclosure of the lower portions, the two pivoted extensions 10 and 10' at the bottom are capable of moving upward, allowing more room for the object to enter the enclosure. Inflatable pillows 25 and 25' are deflated to allow pivoted extensions to move upward. When a person enters and presses down on extensions, the pillows automatically inflate into the position shown in dashed lines, to embrace the object or a person. Extension ends have rubbery resilient sleeves 8. The EM is held in place by bar 3, while the permanent magnet is held in place by bar 4. Extensions 10 and 10' are held up by rubbery stretchable bands 9.

Pressured air canisters 20 provide air when needed for the inflatable pillows 25 and 25'. Air valves 26 are for either inflating or deflating the desired pillow or pillows. Numeral 3' has its lead line pointing to a hole in bar 3 for tightening nut screwed onto a threaded stud, attached to the casing of electromagnet 5. Numeral 44 has its lead line pointing to a soft padding attached to the bottom of lower portions 1 and 2, to provide protection for a person being scooped up.

FIG. 2 shows the same apparatus with its lower portions 1 and 2 separated, when the apparatus is being lowered. The pillows are deflated. The pivoted extensions are free to move upward. They could be held up by rubbery, stretchable bands 9, that offer little resistance when pushed down by the person entering the apparatus' enclosure. The person would stand on the extensions, as well as hold on to handles 12, shown on the lower portions. Upon pushing down the pivoted extension, a valve 21 would open on the line from the pressurized air canister 20 to the pillow on that side and the pillow would be inflated. To deflate the pillow when required, the air valve 26 on the pillow would be depressed to allow the air to escape and deflate the pillow. To repeat the cycle, each canister would be refilled with pressurized air.

FIG. 3 shows one of the elongated members which has a large hole for a pivot pin 7. The shape of the pivoted extension 10 is shown in the side view, FIG. 3A. The recess in the extension allows a person to stand in the opening so the extension can move upward, as shown in FIG. 3, permitting the person to walk out of the enclosure when wanting to do so. An elastic band could cause the pivot extension to rise automatically.

FIG. 4 is an electric circuit for the electromagnet 5 shown in the figures. The DPDT switch 29 performs the function of reversal of EM polarity from, say, plus to minus polarity, either to produce attraction or repulsion of the heads 5 and 6.

In FIG. 4, numeral 30 has its lead line pointing to D.C. Voltage Source E, to magnetize magnet 5 when switch 29 is closed.

Figure 5:
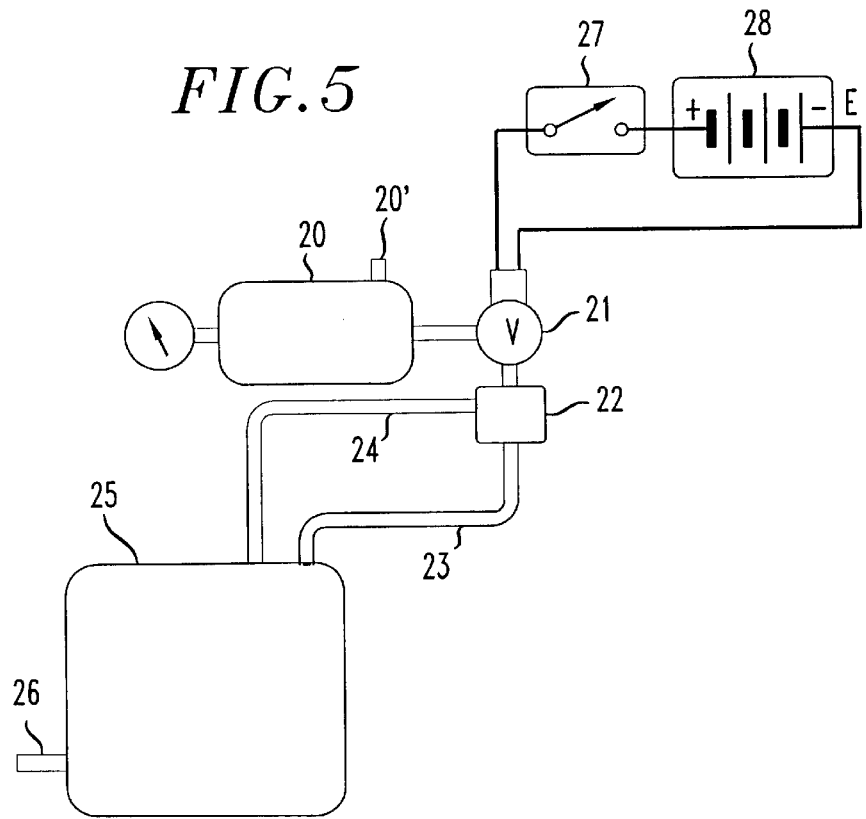
FIG. 5 is a diagram of a technique for maintaining the desired set air pressure in one of the two pillows shown in FIG. 1. The air canister is connected to the pillow via an on/off solenoid valve and a pneumatic switching valve. A manual switch enables the solenoid valve to open and let air from the canister into the pillow.

FIG. 5 shows an automatic pneumatic control system for inflating either one pillow or both pillows of the apparatus. The system includes an air canister 20 for holding pressurized air, an electrically operated open-close valve 21, a proportional air valve #164, 22, by Fisher, interconnecting air tubing 23 to the pillow. This air valve #164 maintains the desired air pressure in accordance with a pressure setting. Different sizes of loads can be accommodated, since the air pressure within the pillow would remain constant automatically at the set air pressure, when the pillow is inflated. In case of Air Valve disfunction, the pillow has an emergency air relief valve 26 for releasing air when air pressure exceeds the setting. Open-close valve 21 is electrically-operated from a voltage source 28 via a step-on switch 27. Valve 22 senses the pillow pressure via feedback hose 24. Valve 22 is completely closed when pillow pressure reaches the setting valve. Pillow 25 is deflated initially and becomes inflated when a person steps on pressure switch 27, closing the circuit. Switch 27 can be manually opened when air pressure to pillow 25 is no longer required. Pillow 25 can be deflated by opening air relief valve 26. Valve 21 is normally closed and opened when voltage is applied from source 28. Safety valve 20' allows air to escape when pressure in canister 20 exceeds the design or preset value. Valve 21 can be a solenoid.

FIG. 6 shows a side view of another configuration of the apparatus, showing one of the elongated members as in FIG. 3. As in FIG. 3, the extension 14 has a recess as shown in FIG. 7, and the pivoted extension is in the upward position, held there by coiled springs each having two ends, one end being attached to the inside wall surface of a lower portion and the other end attached to the extension's pivot pin shaft. The extension is held in rotatable position by shafts extending at each side of its pivoted end. A coiled spring is attached to each pivoted end. When a person enters, he pushes down with either his foot or hand on each extension, causing each extension to assume a horizontal position, thus allowing the pillows to become inflated. The inflated pillows also help keep the extensions down.

FIG. 7 shows an inside front view of the apparatus' elongated member, shown in FIG. 6. FIG. 7 shows how the extension is pivoted at its bottom end with the coiled springs 15 in place. A support 19 for the extension is shown at the bottom of the lower portion, when the extension is in its horizontal position. This elongated member is constructed of two pieces 30 and 13, with the upper piece screwed to the lower portion, as shown in FIGS. 6 and 7. The lower portion has side walls 13', as shown.

In FIG. 7 numeral 7' has its lead line pointing to pivot pin or axle for supporting pivoted extension 14. In FIGS. 6, 7, numeral 27 has its lead line pointing to step-on switch, shown also in FIG. 5. In FIG. 7, numeral 17 has its lead line pointing to bushing that supports axle 7', while numeral 18 identifies lock nut screwed onto end of axle 7'.

In FIGS. 6 and 7, as well as in FIGS. 2, 3 and 3A, to reduce the possibility of injury to a person standing underneath the apparatus, rubbery cushions 44 ate attached to the underneath of lower portions 1 and 2.

DESCRIPTION OF ANOTHER PREFERRED EMBODIMENT

Figure 8:
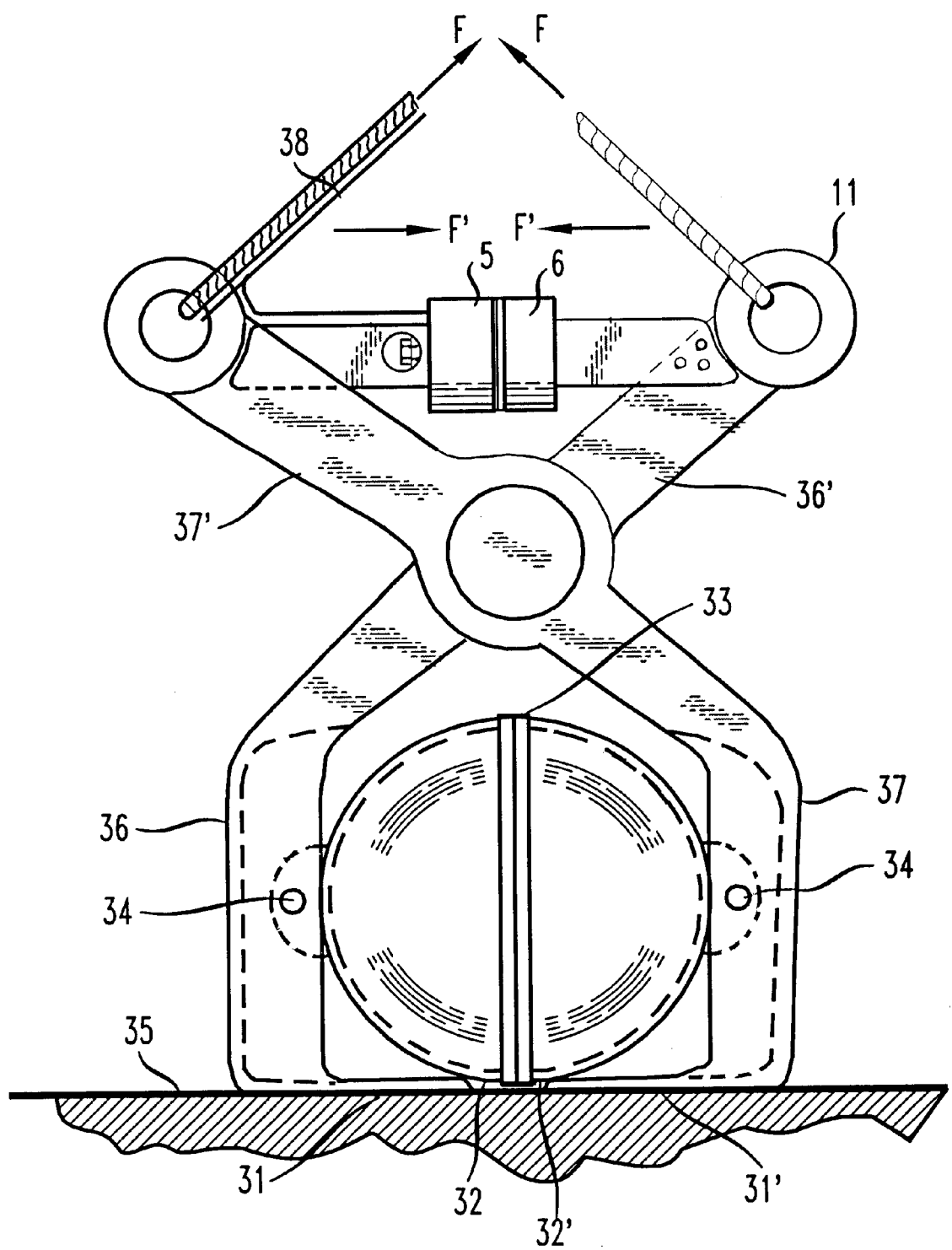
FIG. 8 shows the front view of a technique for the apparatus to scoop up water. Instead of inflatable pillows, pivoted hemispheres are substituted to scoop up the water. Its upper portion is the same as in FIG. 1. The extensions at the bottom are not pivoted.
Figure 9:
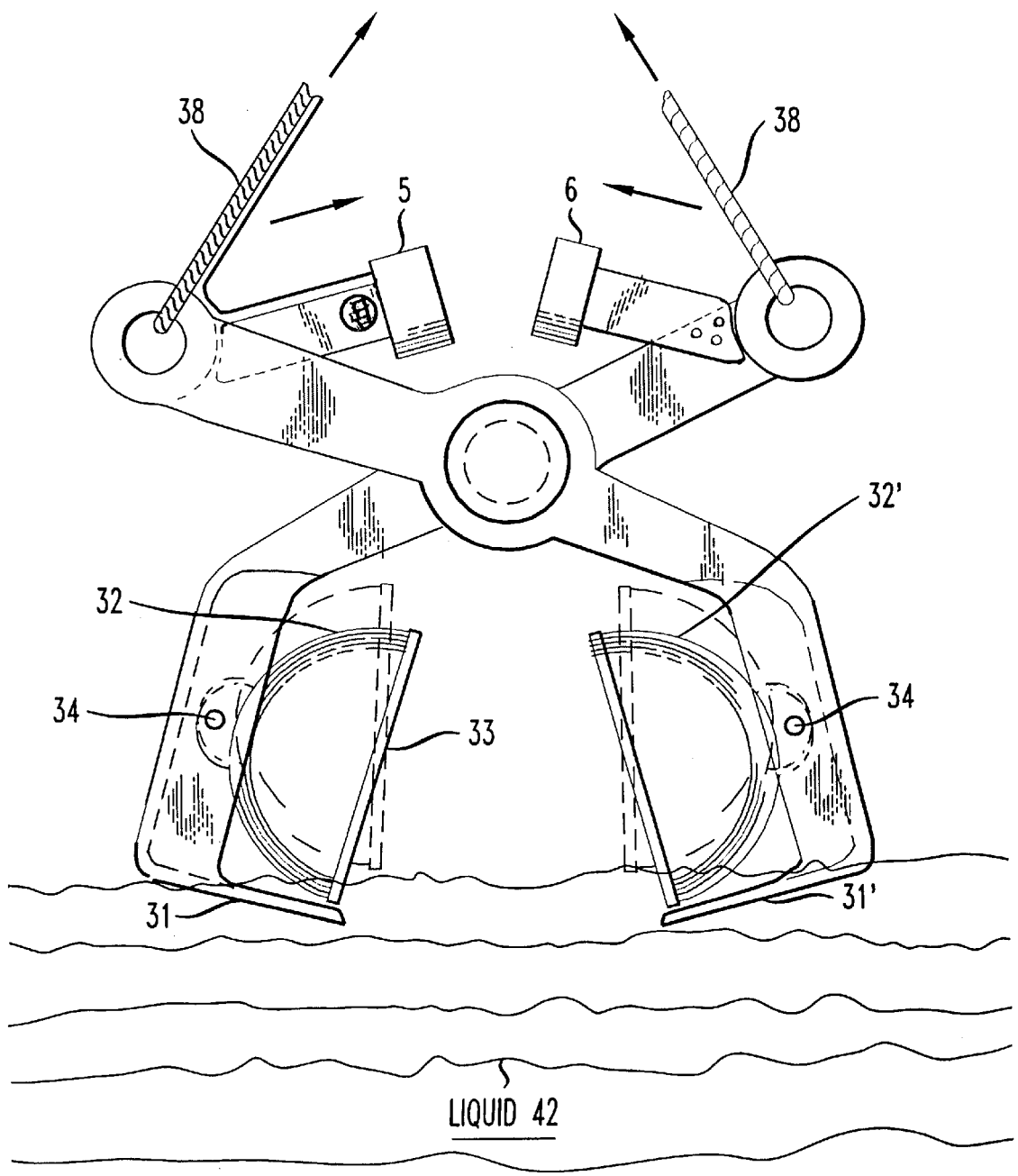
FIG. 9 shows the same assembly with its upper and lower portions spread apart and submerged in liquid. The hollow hemispheres are shown in dashed lines slightly tilted up, enabling them to hold more liquid.

FIG. 8 shows a front view of the Apparatus' assembly embracing a sphere. In this design the upper portion is the same as the assembly shown in FIG. 1. In the lower portions the pillows 25 are omitted, as well as canisters 20. Extensions 31 and 31', FIG. 9, are shorter than 10, 10' and not pivoted. Instead, two pivoted hemispheres 32, 32' are shown, capable of scooping up liquids. The apparatus is shown resting on platform 35. As the apparatus is approaching the liquid from an elevation, upper portions 36', 37', and lower portions 36, 37, are partially spread apart as in FIG. 9. As lower portions 36, 37 with hemispheres 32 and 32' approach and submerge into the liquid, they automatically fully spread apart because hoist cables 38 slacken and weights 11 push apart upper portions 36', 37', by the force of gravity. After submerging into liquid, it is desired to scoop up the liquid. When hoist cables 38 are pulled upward, upper portions 36', 37' automatically pull together by the horizontal components of force F. Magnets 5 and 6 assist in upper portions 36' and 37' coming together. DPDT Switch 29', FIG. 4, is toggled manually to cause magnets 5 and 6 to attract each other, while magnets 5 and 6 are polarized to repel each other when said apparatus is being lowered into the liquid.

FIG. 8 shows the apparatus closed and supported by terrain, while in FIG. 9, the apparatus' lower portions are spread apart. The apparatus with buckets may be used either on terrain or in a body of water to scoop up objects of different shapes and sizes.

The rear of each hemisphere is pivoted to the back surface of a lower portion by a pivot pin 34; pins 34 are pivoted to the sides of lower portions 36 and 37, as shown in FIG. 10A. The liquid is prevented from seeping out through the contacting surfaces of hemispheres 32, 32', by rubbery resilient bands or sleeves 33.

In FIG. 10A, holes 43, in lower portion 37, help lighten the weight of 37 and also allow water to pass through when emersed into fluid, such as water, to help reduce resistance to swaying motion.

FIG. 9 shows the same apparatus as in FIG. 8 with its lower portions separated, when the apparatus is lowered into liquid, as shown. The pivoted hemispheres move a limited amount and they move upward as shown in dashed lines, filling up partially with liquid 42. If the lower portions become more submerged, their hollow insides would be filled completely with liquid. Then, when the apparatus is pulled up by hoist cables 38, lower portions 36 and 37 come together because of the horizontal force components F' of cable force F, FIG. 8. Hemispheres 32 and 32' come together with water or other liquid in their hollow interiors, as shown in FIG. 8. Hemispheres with dashed lines show the positions assumed when submerged in liquid. It should be added that when the two hemispheres come together, rubbery sleeved rims 33 enable the two to form a waterproof, sealed sphere.

FIG. 10 shows a front view of one of the elongated members with lower portion 37 and upper portion 37'. Hemisphere 32' is shown pivoted to the inside recess of lower portion 37. Apparatus' upper portion 37' is identical to upper portion 2' of FIG. 1.

FIG. 10A is a side view of FIG. 10, and shows the position of the hemisphere pivoted to lower portion 37. Rear of hemisphere 32' has two lips or protrusions 39 and 39' with holes for pivot pin 34. Rear of lower portion 37 has projections 40 and 40' and walls 41 for pins 34 to pass through to support hemisphere. The reason for two pins 34 for supporting hemisphere 32' is to prevent skewing of the hemisphere when under stress from the liquid scooped up and from outdoor windy climatic conditions.

Lower portion 2, FIG. 3A, lower portion 13, FIG. 7, and lower portion 37, FIG. 10A, may be perforated to reduce the apparatus' overall weight, as shown in FIG. 7. Lower portions 1, FIG. 1, and 36, FIG. 8, would be included. The perforations 43 on the sides of lower portions 36 and 37 allow air and water to pass through reducing the amount of apparatus' swaying due to harsh environmental conditions.

Symbology

EM=electomagnet

DPDT=double-pole, double-throw

I claim:

1. A light weight load-lifting apparatus for suspension from a helicopter or a derrick, for accommodating a load, consisting of two elongated halves, each with an unbendable knee, each elongated half being pivotally held together by a main pivot pin, for allowing selective relative movement there between each half including an upper portion and a lower portion, said knee existing in said lower portion, each upper portion being configured for use with at least one hoist cable; the lower portion of each elongated half having an inwardly projecting extension at its bottom end, each extension having a free end, each elongated half having an inside wall surface; each upper portion having a bar inwardly extending from an inside surface, each bar having a hammerhead, each hammerhead having a face, each face of the hammerheads when abutting, receiving the major structural compressive stresses imposed by horizontal components of said hoist cables, when supporting said load; a remotely-controlled means for selectively controlling the lower portions of said halves between a closed position and a spread apart position; securing means for helping to keep said load in place on each extension, thus helping to provide positive secure retention for the load being lifted, either retrieved or rescued, each said upper portion having a weight on its top end, each said weight assisting in said lower portion's separation at said apparatus' touchdown; wherein a first of said hammerheads having an electromagnet with a magnetizable core and wired to a DPDT switch with a voltage source for controlling said electromagnet's polarity, the other said hammerhead having one or more permanent magnets facing said magnetizable core of said first hammerhead; when said electromagnet's polarity is the same as that of said permanent magnet's, hence, said upper portions separate from each other; when said electromagnet's polarity is the opposite of that of said permanent magnet's, said hammerheads attracting each other by keeping upper and lower portions in a closed position, wherein positive load retention is achieved, helping to keep said load in place by keeping upper and lower portions in a closed position.

2. An automatically-actuated load-lifting apparatus in accordance with claim 1, wherein at least one inflatable pillow being attached along each of said inside wall surfaces and each said inwardly projecting extension is pivotally connected to the bottom end of said lower portions said projecting extensions being capable of being held in a raised position by a biasing means to allow a person to easily enter the opening between the apparatus' lower portions while said pillow is in a deflated condition, selective inflation of each said pillow helping to keep each said extension in a lowered position, by its abutment.

3. An automatically-actuated load-lifting apparatus, in accordance with claim 2, wherein said load is a person and said person inflates said pillow by moving said extension to a lowered condition thereby opening a valve for allowing high pressure air from a canister to enter said pillow, thus said person being securely embraced by each said pillow when said apparatus is hoisted; opening an exhaust valve on each of said pillows for selectively deflating each said pillow for allowing a person to exit the apparatus more easily.

4. An automatically-actuated load-lifting apparatus in accordance with claim 3, wherein its lower portions have an enclosure and each of said projecting extensions has a recess at its center to allow a person to stand in the opening of said recess so the extension may move upward; permitting the person to walk out of the enclosure more easily, said extension being lifted automatically by a biasing means after deflation of each said pillow.

5. An automatically-actuated lifting apparatus as in claim 3, wherein at least one air-pressured canister is provided, having hose connections to at least one said pillow by means of flexible hoses via an electrically-operated solenoid valve and a pneumatic switching valve with air feedback from at least one said pillow and with preset pressure capability, said canister capable of holding air at a much higher pressure than said pillow, said switching valve's opening depending on the air pressure preset for at least one pillow, said switching valve closing completely when said pillow's pressure reaches said set pressure, said pillow and said canister provided with air valves for pumping air into said canister and into each said pillow from an external source, said preset pressure to be of such a value as to keep said load securely and firmly in place within said lower portions of said apparatus, said solenoid valve being electrically opened by closing a switch, operated by pressing down of said lifted extension, said switch being connected to a voltage source.

6. An automatically-actuated weight-lifting apparatus in accordance with claim 2, wherein said biasing means is a coiled spring with ends, one end of each spring being attached to said inside wall surface and the other end being attached to said extension's pivoted end, a person, entering the opening between the apparatus' lower portions, capable of pushing down and standing on said extension; with said extension up when said apparatus is lowered onto said person, the person being less likely to be struck by the end of said extension; additionally, with the extension in the up position for storage in said helicopter, less storage space being required than with the extension in the down-position.

7. An automatically-actuated, load-lifting apparatus in accordance with claim 2, wherein said biasing means is a rubbery stretchable band with ends, one end of each band being attached to said inside wall surface and the other end being attached to said extension, a person entering the opening between the apparatus' lower portions, capable of pushing down and standing on said extension; with said extension in the up-position when said apparatus is lowered over said person, the person being less likely to be struck by the end of said extension.

8. An automatically-actuated load-lifting apparatus in accordance with claim 1, wherein said apparatus has lower portions, each said lower portion having a hemisphere with a rubbery rim and a hollow interior, means for attachment to said inside wall surface; and with said hollow interior facing toward the inside of said apparatus; said apparatus' lower portions in a separated position being lowered into liquid, said hemisphere able to scoop up said liquid, each said rim having a rubbery, resilient band attached making the closed hemispheres water tight, thus enabling said liquid to be transported elsewhere by said helicopter, said means of attachment of said hemisphere to said wall surface being by a pivot pin, enabling the rim of each hemisphere to be aligned with the other one.

\* \* \* \* \*